(12) United States Patent
Poland et al.

(10) Patent No.: US 6,692,441 B1
(45) Date of Patent: Feb. 17, 2004

(54) SYSTEM FOR IDENTIFYING A VOLUME OF INTEREST IN A VOLUME RENDERED ULTRASOUND IMAGE

(75) Inventors: McKee D. Poland, Andover, MA (US); Ivan S. Salgo, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/293,988

(22) Filed: Nov. 12, 2002

(51) Int. Cl.[7] .................................................. A61B 8/00
(52) U.S. Cl. ...................................... 600/443; 128/916
(58) Field of Search ................................. 600/407–471; 367/7, 11, 130, 138; 73/625, 626, 620, 633; 128/916; 345/419, 424, 421, 423, 427, 557; 359/9, 20, 25

(56) References Cited

U.S. PATENT DOCUMENTS 5,720,291 A * 2/1998 Schwartz ..................... 600/456
6,544,179 B1 * 4/2003 Schmiesing et al. ......... 600/447

* cited by examiner

*Primary Examiner*—Ali M. Imam
(74) *Attorney, Agent, or Firm*—John Vodopia

(57) ABSTRACT

A system and method for identifying and selecting a volume of interest within a volume rendered image is disclosed. In one embodiment, the invention collects acoustic data, develops a three dimensional (3D) ultrasound image from the collected acoustic data, renders the ultrasound image on a display, modifies selected portions of the acoustic data, and displays the modified acoustic data in the form of a highlighted region on the rendered ultrasound image, wherein the highlighted region defines an included volume.

31 Claims, 9 Drawing Sheets

SYSTEM FOR IDENTIFYING A VOLUME OF INTEREST IN A VOLUME RENDERED ULTRASOUND IMAGE

TECHNICAL FIELD

The present invention relates generally to ultrasonic diagnostic systems, and, more particularly, to identifying a volume of interest, or a sub-volume, within a volume rendered image.

BACKGROUND OF THE INVENTION

Ultrasonic transducers and imaging systems have been available for quite some time and are particularly useful for non-invasive medical diagnostic imaging. Ultrasonic transducers are typically formed of either piezoelectric elements or of micro-machined ultrasonic transducer (MUT) elements. When used in transmit mode, the transducer elements are excited by an electrical pulse and in response, emit ultrasonic energy. When used in receive mode, acoustic energy impinging on the transducer elements is converted to a receive signal and delivered to processing circuitry associated with the transducer.

The transducer is typically connected to an ultrasound imaging system that includes processing electronics, one or more input devices and a suitable display on which the ultrasound image is viewed. The processing electronics typically include a transmit beamformer that is responsible for developing an appropriate transmit pulse for each transducer element, a receive beamformer that is responsible for processing the receive signal received from each transducer element, and additional processing circuitry that receives the data from the receive beamformer and converts the data so that an ultrasound image may be rendered on a display.

An ultrasonic transducer is typically combined with associated electronics in a housing. The assembly is typically referred to as an ultrasonic probe. Typically, ultrasonic probes are classified as either one-dimensional (1D) probes having a single element wide array of elements, or two-dimensional (2D) probes having a multiple element wide array. Furthermore, a probe referred to as a "bi-plane" probe includes two orthogonally positioned 1D arrays that may or may not intersect. A relatively new 2D probe, referred to as a "matrix probe" includes transducer elements arranged in two dimensions where each element is individually controllable, resulting in an ultrasound probe the scan lines of which can be electronically steered in two dimensions. Each dimension of a matrix probe can be thought of as a stack of contiguous linear arrays.

A matrix probe can comprise either a "fully sampled" or a "sparsely sampled" aperture. In a fully sampled aperture, every transducer element is individually addressable and controllable, and all elements are contiguous. In a sparsely sampled aperture, a subset of the physical set of transducer elements is addressed and controlled, or equivalently, there is a pattern of physical gaps between some elements such that they are not all contiguous. Sparsely sampled 2D arrays allow for fewer system connections (fewer channels) while still achieving distribution of the acoustic elements in two dimensions. However, a significant drawback of sparse 2D arrays is the loss of ability to control scan beam shape.

Regardless of the type of transducer probe and related electronics, medical ultrasound imaging systems generally project a cursor onto the display of the ultrasound image. The cursor may take the form of a point, an "X," a cross-hair, or other type of indicator that a user of the ultrasound system can use to identify specific portions of the ultrasound image to, for example, emphasize an anatomic feature of interest for the purpose of system control or visualization. Ultrasound imaging systems that can render a three-dimensional volume of an image generally use a cursor that is presented as reference lines drawn on scan planes of the image or drawn through a rendered volume, such as the scan planes 4 and 6 of the image 2 of FIG. 1. Alternatively, another example of a conventional cursor for a three-dimensional volume rendering is a wire-frame shape, such as a trapezoidal or frustum shape superimposed on a rendered volume. Such a cursor is illustrated in FIG. 2 in which a two-dimensional cursor 14 in the form of a wire-frame trapezoid is superimposed on a rendered image 12. These cursors aid the user of the ultrasound imaging system in selecting the planes of the three-dimensional data that are to be displayed.

Unfortunately, existing three-dimensional rendering systems lack the ability to allow a user to identify a volume of interest within the rendered image, or select a sub-volume of the three-dimensional data to display. For example, the superimposed two-dimensional cursor does not allow the user to adequately indicate the volume, or sub-volume of interest.

Therefore, it would be desirable to have an ultrasound imaging system capable of allowing a user to conveniently identify a three-dimensional volume of interest in a rendered image using a cursor that allows a user to view the data selected in a volume of interest while scanning or while viewing a previously scanned image.

SUMMARY

Embodiments of the invention include a system and method for presenting a volume cursor on an ultrasound image, and include a system and method for identifying a volume of interest to a user of a three dimensional (3D) ultrasound imaging system. In one embodiment, the invention collects acoustic data, develops a three dimensional (3D) ultrasound image from the collected acoustic data, renders the ultrasound image on a display, modifies selected portions of the acoustic data, and displays the modified acoustic data in the form of a highlighted region on the rendered ultrasound image, wherein the highlighted region defines an included volume.

Other systems, methods, computer readable media, features, and advantages of the invention will be or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the present invention.

DETAILED DESCRIPTION

Figure 1:
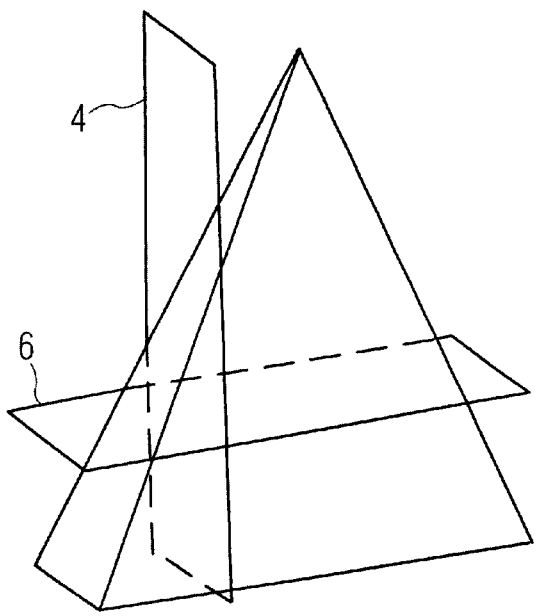
FIG. 1 is a graphical diagram illustrating a prior art cursor in an ultrasound image.
Figure 2:
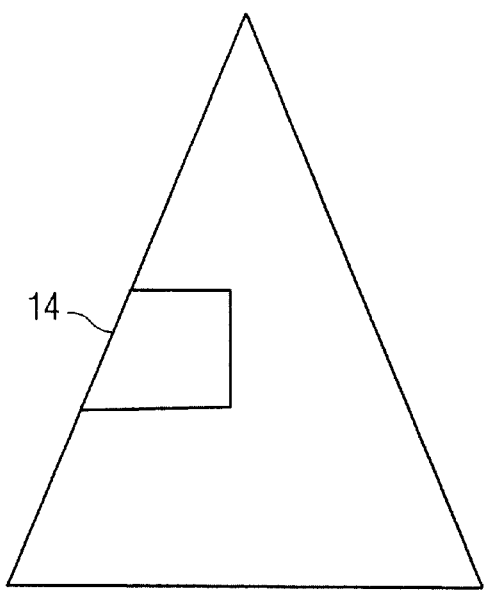
FIG. 2 is a graphical diagram illustrating another prior art cursor in an ultrasound image.

The invention described hereafter is applicable to any ultrasound imaging system in which it is desirable to display a volume cursor on an ultrasound system, and to indicate a volume of interest in a volume rendered ultrasound image. The invention is also applicable to any ultrasound imaging system in which it is desirable to use the volume cursor to indicate a selected sub-volume in a volume rendered ultrasound image.

Furthermore, portions of the following description are presented in terms of routines and symbolic representations of data bits within a memory, associated processors and possible networks or networked devices. These descriptions and representations are used by those having ordinary skill in the art to effectively convey the substance of their work to others having ordinary skill in the art. A routine embodied in software is here, and generally, intended to be a self-consistent sequence of steps or actions leading to a desired result. Thus, the term "routine" is generally used to refer to a series of operations stored in a memory and executed by a processor. The processor can be a central processor of an ultrasound imaging system or can be a secondary processor of the ultrasound imaging system. The term "routine" also encompasses such terms as "program," "objects," "functions," "subroutines," and "procedures."

In general, the sequence of steps in the routines requires physical manipulation of physical quantities. Usually, though not necessarily, these quantities take the form of electrical or magnetic signals capable of being stored, transferred, combined, compared or otherwise manipulated. Those having ordinary skill in the art refer to these signals as "bits," "values," "elements," "characters," "images," "terms," "numbers," or the like. It should be understood that these and similar terms are to be associated with the appropriate physical quantities and are merely convenient labels applied to these quantities.

In the present application, the routines, software, and operations are machine operations performed in conjunction with human operators. In general, the invention relates to method steps, software and associated hardware including a computer readable medium configured to store and execute electrical or other physical signals to generate other desired physical signals.

The apparatus of the invention is preferably constructed for the purpose of ultrasonic imaging. However, a general-purpose computer can perform the methods of the invention or other networked device selectively activated or reconfigured by a routine stored in the computer and coupled to ultrasound imaging equipment. The procedures presented herein are not inherently related to any particular ultrasonic imaging system, computer or apparatus. In particular, various machines may be used with routines in accordance with the teachings of the invention, or it may prove more convenient to construct more specialized apparatus to perform the method steps. In certain circumstances, when it is desirable that a piece of hardware possess certain characteristics, these characteristics are described more fully below.

With respect to the software routines described below, those having ordinary skill in the art will recognize that there are a variety of platforms and languages for creating instruction sets for performing the routines described below. Those having ordinary skill in the art will also recognize that the choice of the exact platform and language is often dictated by the specifics of the actual system constructed, such that what may work for one type of system may not be efficient on another system.

Figure 3:
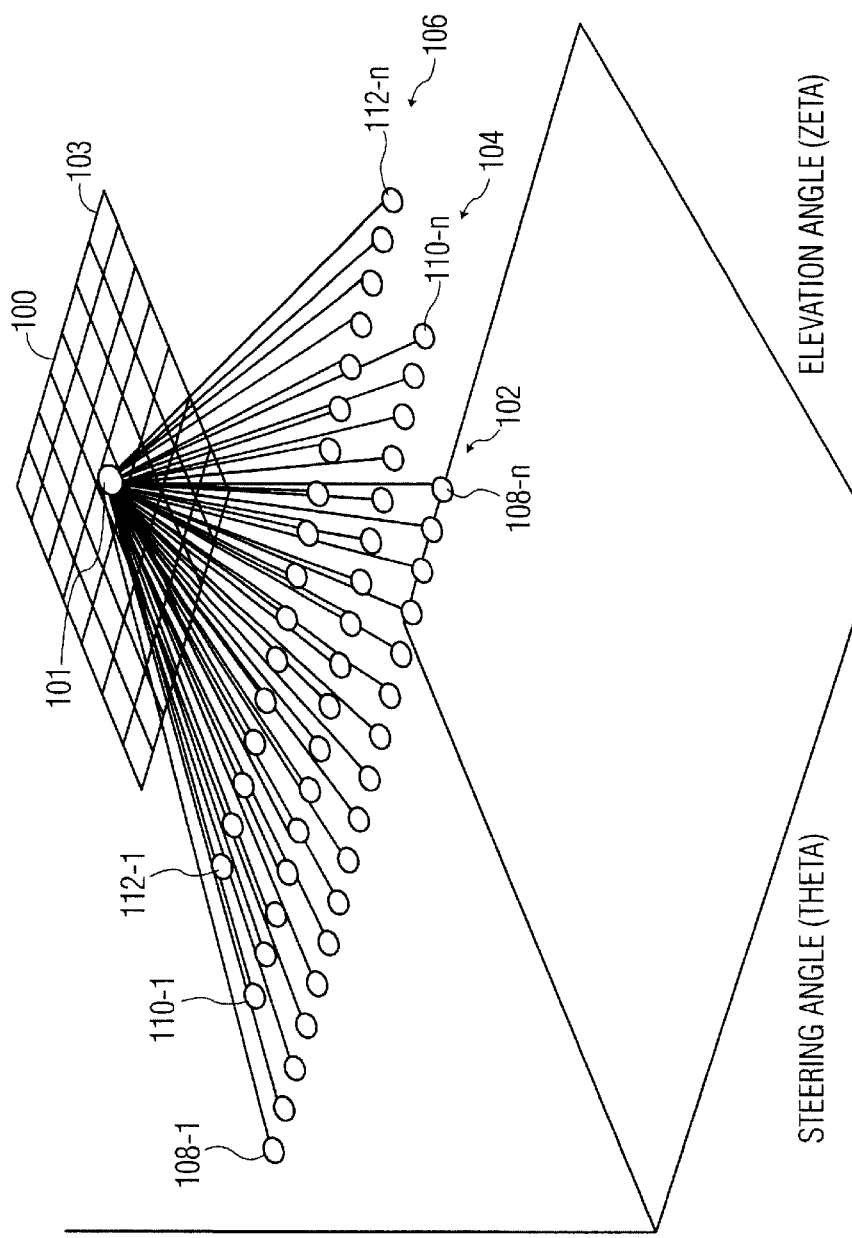
FIG. 3 is a schematic diagram illustrating the manner in which an ultrasound probe develops scan slices and uses the scan slices to interrogate a volume.

FIG. 3 is a schematic diagram illustrating one manner in which an ultrasound probe develops scan slices and uses the scan slices to interrogate a volume. Ultrasound data is typically acquired in frames, where each frame represents one or more sweeps of an ultrasound beam emanating from the face of the probe 100. The probe 100 includes a two-dimensional array of transducer elements; an exemplary one of which is illustrated using reference numeral 103. Such a sweep is typically developed by generating a large number of individual scan lines along one scan plane. An example of one scan plane, or "slice," is illustrated using reference numeral 102 and the scan plane comprises individual scan lines 108-1 through 108-n. Exemplary scan slices 104 and 106 are also illustrated. In this case, each slice is in the shape of a sector, and the "origin" 101 of each scan line is located at the center of the surface of the physical face of the probe 100.

The scan lines are typically steered in 2 dimensions during scan sweeps to create a set of rastered scan slices, exemplary ones of which are illustrated as slices 102, 104 and 106, where each slice interrogates a 2-dimensional "sector region" of the field of view. In effect, each slice 102, 104 and 106 represents a traditional two-dimensional sweep, with each sweep being displaced in elevation from the neighboring sweep. Those skilled in the art will recognize that trapezoidal or parallelogram shapes can be generated for each of the slices instead of sectors. Furthermore, a large number of such slices, slightly displaced in elevation, can be used to interrogate a volume.

Assembling the data from the sector slices produces a three-dimensional set of data referred to as a scan volume, which is displayed to a user as a volume rendered image. Since all of the lines originate from the same point, the rendered 3D volume appears as a pyramid or cone, where the apex of the volume is the scan origin at the transducer probe face, which is located at the patient's skin surface.

An ultrasound imaging systems develops this volume scan by generating multiple slices in at least two dimensions. These multiple slices generate ultrasound data for the volume occupied by the slices. To produce three-dimensional images, this volume of data is then processed by the ultrasound imaging system to create an image for display on a two-dimensional surface (such as the surface of the CRT type display) that has the appearance of being three-dimensional. Such processing is typically referred to as a rendering, and in this example, renders the above described volume rendered image.

Figure 4:
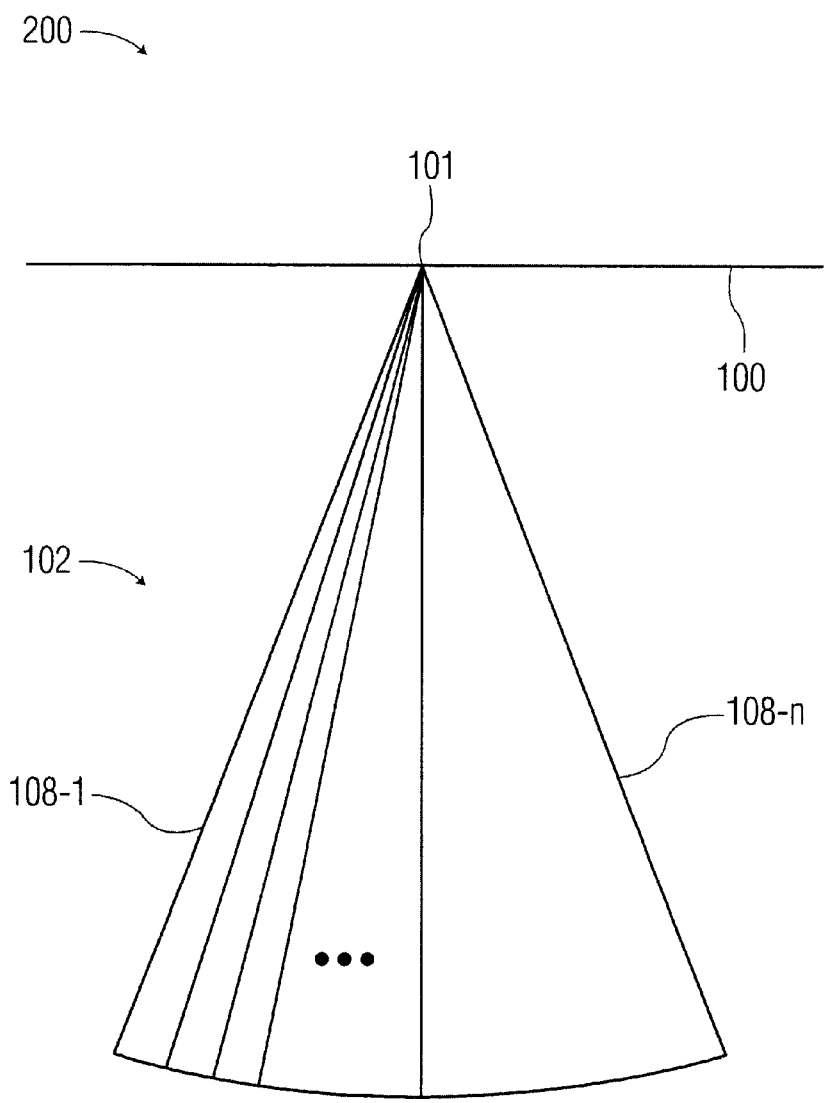
FIG. 4 is a graphical representation of one of the ultrasound slices of FIG. 3.

FIG. 4 is a graphical representation of one of the ultrasound slices of FIG. 3. The slice 102 includes scan lines 108-1 through 108-n emanating from the origin 101 of the transducer probe 100.

Figure 5:
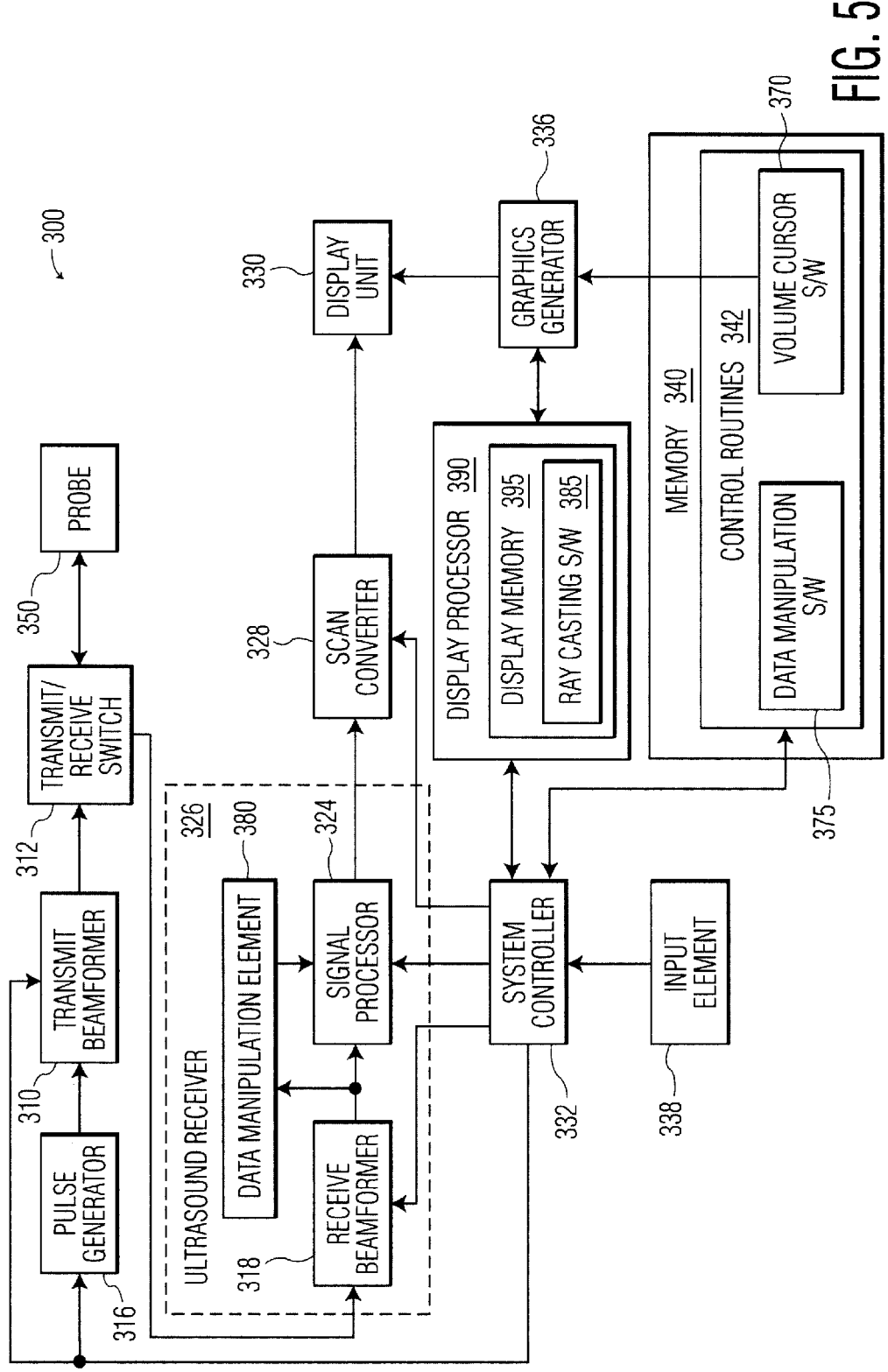
FIG. 5 is a block diagram illustrating an ultrasound imaging system in accordance with an embodiment of the invention.

FIG. 5 is a block diagram illustrating an ultrasound imaging system 300 that can be used to implement different embodiments of the invention. It will be understood by those having ordinary skill in the art that the ultrasound imaging system 300, as illustrated in FIG. 5, and the operation thereof as described below, is intended to be generally representative of such systems and that any particular system may differ significantly from that shown in FIG. 5. The ultrasound imaging system 300 includes a transmit beamformer 310 coupled through a transmit receive (T/R) switch 312 to a probe 350. While the probe 350 may be any transducer probe, a matrix transducer probe is preferred for obtaining three dimensional images and will be discussed for simplicity. The matrix probe 350 includes a matrix transducer array having a plurality of transducer elements arranged across two dimensions. The system 300 can randomly select any point on the matrix probe 350 as the point from which the ultrasonic energy is projected. While the matrix probe 350 will be referred to as a fully sampled array, a sparse array configuration is also possible. As described above, a fully sampled array is one in which each element is individually addressable. Either fully sampled or sparse array configurations may benefit from the various embodiments of the invention to be described below.

The T/R switch 312 typically includes one switch element for each transducer element. Alternatively, the matrix probe 350 may have multiplexing circuitry, or the like, to reduce the number of leads between the T/R switch 312 and the matrix probe 350, thereby reducing the number of required switches. The transmit beamformer 310 receives pulsed sequences from a pulse generator 316. The matrix probe 350, energized by the transmit beamformer 310, transmits ultrasound energy into a region of interest in a patient's body and receives reflected ultrasound energy, commonly referred to as echoes, from various structures and organs within the body. As is known in the art, by appropriately delaying the waveforms applied to each transducer element by the transmit beamformer 310, a focused ultrasound beam may be transmitted from the matrix probe 350.

The matrix probe 350 is also coupled, through the T/R switch 312, to a receive beamformer 318. Ultrasound energy from a given point within the patient's body is received by the transducer elements at different times. The transducer elements convert the received ultrasound energy to transducer signals which may be amplified, individually delayed and then summed by the receive beamformer 318 to provide a beamformed signal that represents the received ultrasound levels along a desired receive line ("beam"). The receive beamformer 318 may be a digital beamformer including an analog-to-digital converter for converting the transducer signals to digital values, or may be an analog beamformer. As known to those skilled in the art, the delays applied to the transducer signals may be varied during reception of ultrasound energy to effect dynamic focusing. The process is repeated for multiple scan lines to create a frame of data for generating an image of the region of interest in the patient's body.

Even though known systems employing matrix probes concentrate on scanning complete volumes, the matrix probe 350 is capable of providing a variety of scan patterns such as a sector scan, where scan lines may appear to originate at any point on the matrix probe 350 and are directed at different angles, a linear scan, a curvilinear scan and other scan patterns.

The receive beamformed signals are then applied to a signal processor 324, which processes the beamformed signal for improved image quality. The receive beamformer 318 and the signal processor 324 comprise an ultrasound receiver 326. In one embodiment of the invention, to be described below, the ultrasound receiver 326 includes a data manipulation element 380. The data manipulation element 380, together with the data manipulation software 375, both of which will be described in greater detail below, cooperate to modify selected portions of selected scan data generated by the receive beamformer to display a volume cursor to a user of the system 300. The volume cursor can be thought of as a methodology for highlighting a volume of interest within the image displayed to a user. According to this embodiment, selected portions of the ultrasound scan data (e.g., selected portions of selected scan lines) are modified to generate and display a volume of interest within the volume rendered image. The volume of interest can be thought of as a volume cursor within the volume rendered image. The volume cursor can be used to, for example, identify and select a sub-volume within the volume rendered image.

In an alternative system configuration, different transducer elements are used for transmitting and receiving. In such a configuration, the T/R switch 312 may not be required, and the transmit beamformer 310 and the receive beamformer 318 may be connected directly to the respective transmit and receive transducer elements.

The output of the signal processor 324 is supplied to a scan converter 328, which converts sector scan and other scan pattern signals to conventional raster scan display formats. The output of the scan converter 328 is supplied to a display unit 330, which displays an image of the region of interest in the patient's body. In accordance with the embodiments of the invention, the displayed image includes a highlighted volume of interest, also referred to as a volume cursor.

The system controller 332 provides overall control of the system. The system controller 332 performs timing and control functions and typically includes a microprocessor operating under the control of a display processor 390, a graphics generator 336 and control routines 342. The display processor includes a display memory 395, which includes a ray casting software element 385. In accordance with an alternative embodiment of the invention, to be described below, the ray casting software 385 operates on display data to highlight a volume of interest within a volume rendered image.

The memory 340 includes control routines 342, which include the data manipulation software 375 and volume cursor software 370. In accordance with another alternative embodiment of the invention, the volume cursor software 370 projects a three-dimensional cursor on the display unit 330. It is understood that while the memory 340 and the display memory 395 are illustrated as two separate memory elements, they could also be separate sections of the same memory, or can be separate sections of a distributed memory. The description of the memory elements in FIG. 5 is for exemplary purposes only.

The system controller 332 also uses the memory 340 to store intermediate values, including system variables describing the operation of the ultrasound imaging system 300. Although not shown, an external storage device may be used for permanent and/or transportable storage of data. Examples of devices suitable for use as an external storage element include a floppy disk drive, a CD-ROM drive, a videotape unit, etc.

In accordance with a first embodiment of the invention, the volume cursor software 370 projects a three dimensional cursor on a volume rendered image that is displayed to a user on the display unit 330. The three-dimensional cursor, which can be in the form of a wire frame shape, can be used to select a sub-volume within the volume rendered image, either during real-time scanning or while viewing a previously scanned image.

In accordance with a second embodiment of the invention, a volume of interest is highlighted within a volume rendered image by the data manipulation software 375 and the data manipulation element 380. The data manipulation element 380, together with the data manipulation software 375, both of which will be described in greater detail below, operate to modify selected portions of selected scan data generated by the receive beamformer to highlight a region of interest within a volume rendered image to a user of the system 300. The selected portions of the scan data can be, for example, presented in a differentiating color, thereby presenting to a user a volume of interest that appears different from the volume rendered image. This volume of interest can be used as a movable "volume cursor" to allow the user to identify and select a particular volume of interest within the volume rendered image.

In accordance with a third embodiment of the invention, the ray casting software 385 operates on display data to highlight a volume of interest within a volume rendered image. A volume rendered image is generated from a number of volume elements, referred to as "voxels." The ray casting software 385 alters the opacity of each voxel used for the volume rendered image to make portions of the image appear translucent, or semi translucent, on the display unit 330. The ray casting software 385 then performs what is referred to as a "ray casting" process, which is well known to those skilled in the art. An integral is taken along an imaginary ray through each voxel in the volume of interest. In the process of forming the integral, the voxels that lie within the volume of interest are weighted differently, preferably with a higher numeric value, than those that lie outside of the volume of interest. This process increases the opacity of the voxels within the region of interest, thereby highlighting the volume of interest (increased opacity) within the volume rendered image (decreased opacity). In this manner, the volume of interest can be presented to a user of the system as a movable three dimensional "volume cursor" that can be used to identify and select a particular volume of interest within the volume rendered image.

A user communicates commands to the ultrasound imaging system 300 via the input element 338, which may include, among other devices, a mouse, keyboard, stylus, or may include a combination of input devices, such as keys, sliders, switches, touch screens, a track ball, or other input devices that enable the user of the ultrasound imaging system 300 to communicate the desired ultrasound image to the system controller 332. When the desired ultrasound image is communicated to the system controller 332, the system controller 332, in cooperation with the control routines 342 and the graphics generator 336, determines the appropriate scan lines that should be projected by the matrix probe 350 to achieve the desired ultrasound image communicated to the system controller 332 via input element 338. The system controller 332 then communicates with the pulse generator 316 and the transmit beamformer 310 in order to generate such appropriate scan lines.

To move the volume cursor, elements of the user interface allow adjustments to the set of voxels within the volume rendered image that are chosen to be within the volume of interest (and thus get different weighting in the ray casting integral). The voxels lie in three-dimensional space, so they preferably have Cartesian or polar coordinates. For example, assume Cartesian coordinates X, Y, and Z. The shape of the volume of interest determines the coordinates in its group of voxels. Various well-understood algorithms can form the group of voxel coordinates according to a selected shape and size. User input requests changes to the VOI shape or position, changes such as translating, rotating, magnifying, or reducing the size of the volume of interest. Each change causes volume cursor SW 370 to recalculate the membership of the volume of interest voxel group by converting the previous coordinate set of the group to a new coordinate set. The simplest example is translation, for example, in the X dimension. To translate the volume of interest on the screen, the X coordinate of every voxel in the VOI group is incremented.

In an alternative system configuration, different transducer elements are used for transmitting and receiving. In such a configuration, the T/R switch 312 may not be required, and the transmit beamformer 310 and the receive beamformer 318 may be connected directly to the respective transmit and receive transducer elements.

Figure 6:
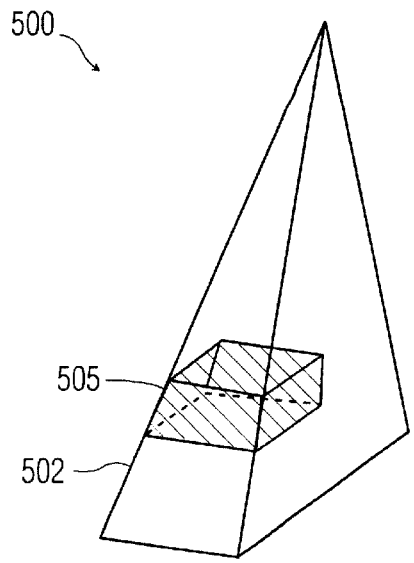
FIG. 6 is a graphical illustration of scan volume of a first embodiment of the invention.

FIG. 6 is a graphical illustration of scan volume 500 of a first embodiment of the invention. The scan volume 500 includes a "volume rendered image" 502 into which a three-dimensional cursor 505 is superimposed, or projected, to a user. The three-dimensional cursor 505 can be used to identify a volume of interest, or a sub-volume of interest, within the volume rendered image 502. The three-dimensional cursor 505 is moveable within the volume rendered image 502 and can be displayed as part of a live three-dimensional rendering on the display unit 330 (FIG. 5).

The three-dimensional cursor 505 can be moved by receiving appropriate input from a user via the input element 338 of FIG. 5. The three-dimensional cursor 505 shown in FIG. 6 is a wire frame rendering. However, other rendering techniques can be used to project the three-dimensional cursor 505 within the volume rendered image 502.

Figure 7:
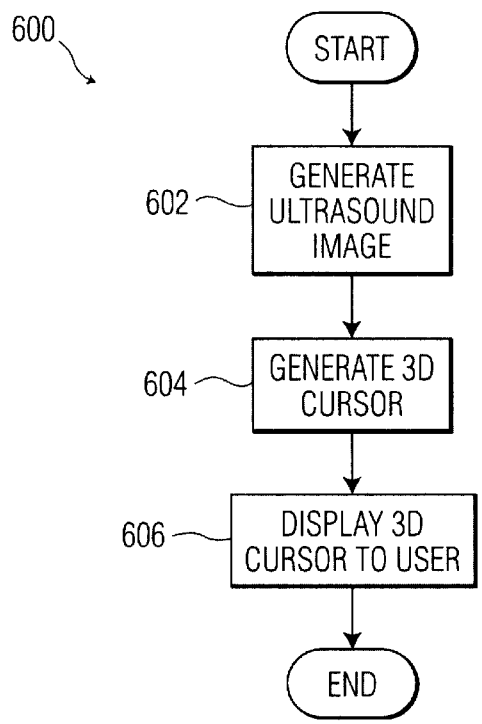
FIG. 7 is a flow chart describing the operation of the volume cursor software of FIG. 5.

FIG. 7 is a flow chart 600 describing the operation of the volume cursor software 370 of FIG. 5. In block 602 an ultrasound image is generated by the system 300 and displayed on the display unit 330. The ultrasound image generated in block 602 corresponds to the volume rendered image 502 of FIG. 6.

In block 604, the volume cursor software 370 generates the three-dimensional cursor 505 of FIG. 6. In block 606, the three-dimensional cursor 505 is displayed to a user on the display unit 330 along with the volume rendered image 502 (FIG. 6).

Figure 8:
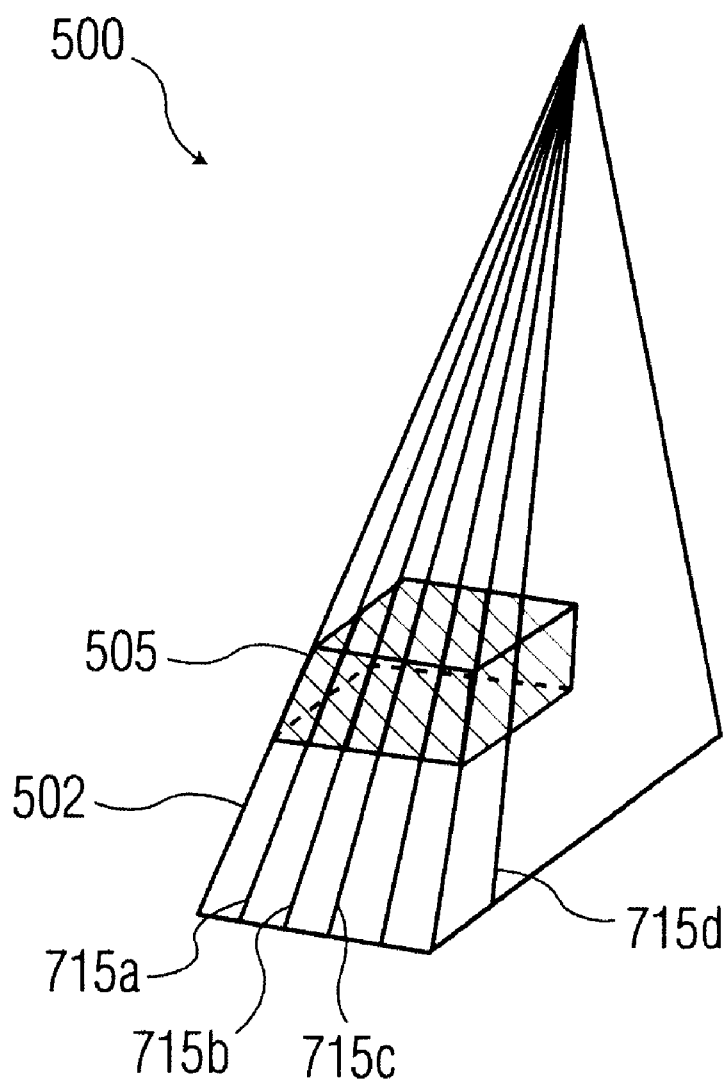
FIG. 8 is a graphical illustration of a scan volume showing a second embodiment of the invention.

FIG. 8 is a graphical illustration of a scan volume 700 showing a second embodiment of the invention. The scan volume 700 includes a volume rendered image 702. A volume of interest within the volume rendered image 702 is indicated using, for example, a highlighted region 705. Although useful for providing the user of the system 300 with an accurate view of the volume of interest, the highlighted region 705 is not referred to as a "cursor" because the term cursor implies a an attribute superimposed over an image. As will be described below, the data in the highlighted region 705 is manipulated to highlight that volume of interest to a user. In other words, the highlighted region 705 is formed from the ultrasound data in the volume of interest. The highlighted region 705 is generated from ultrasound scan data by the data manipulation software 375 and the data manipulation element 380 of FIG. 5. In accordance with this embodiment of the invention, scan data at the output of the receive beamformer 318 is modified. For example, selected portions of selected scan line data may be highlighted using, for example, a differentiating color or differentiating intensity of those portions of the scan data. Alternatively, an acoustic gain of the selected portions of the scan data can be altered to differentiate those portions of the scan data to highlight the volume of interest. Altering the gain produces the increased intensity, so gain and intensity are closely related. The color information may be applied to the volume of interest by using what are referred to as "tag-along" bits, which accompany the acoustic data bits as markers for colorization downstream in the processing, at, for example, the scan converter 328. Also, other types of modification to the acoustic data are possible. For example, the acoustic data can be modified by filtering in the signal processor 324, or by selectively configuring the transmit scan lines that fall within the volume of interest.

The highlighted region 705 illustrates this volume of interest. In other words, the volume cursor is not actually a "cursor," but is the selected portions of the modified acoustic scan data highlighted in the volume of interest so that the modified portions of the scan data create the highlighted region 705.

In accordance with this embodiment of the invention, selected portions of data (i.e., selected scan lines), and further, selected portions of those scan lines, are modified by the data manipulation element 380 and the data manipulation software 375 to highlight those selected portions of the scan data. The selected portions of the scan data are then displayed to a user as the highlighted region 705. Essentially, the highlighted region 705 appears to a user as a three-dimensional volume of interest that can be moved within the volume rendered image 702 to highlight and identify selected volumes (or sub-volumes) within the volume rendered image 702. This is illustrated by the portions of scan lines 715a, 715b, 715c and 715d being brighter within the highlighted region 705 than in the area of the rendered volume 702 that is outside the highlighted region 705.

For example, to isolate the volume of interest in the radial direction, the system controller 332 alters the gain in a window along each scan line in the volume of interest. The start and end samples of the window determine the top and bottom of the volume of interest. To isolate the volume of interest in the lateral and elevation dimensions, the system controller 332 chooses only those scan lines that pass through the volume of interest for any gain change by windowing, as described above.

The scan data is modified to create the volume of interest before the data reaches the rendering process (i.e., the scan converter 328, the graphics generator 336 and the display unit 330). The data (i.e., the selected portions of the ultrasound scan data) within the highlighted region 705 undergoes all the same transformations as the scan data. In this embodiment, there is no need to convert the cursor shape from Cartesian coordinates to the coordinates of the acoustic scan lines, which are typically polar or spherical. Nor is there a need to align the highlighted region with the rendering, or is there a need to compensate for clipping or shading. Essentially, the rendering process treats the volume of interest indicated by the highlighted region 705 the same as it does the data within the volume rendered image 702, including the effects of perspective, dimming the background, etc. The result is a preferable representation of the volume of interest within the highlighted region 705, showing, in the same three-dimensional view, the structures that are indicated in the volume of interest by the highlighted region 705 and those structures that are outside its bounds, and which have the same position and lighting relationships.

Figure 9:
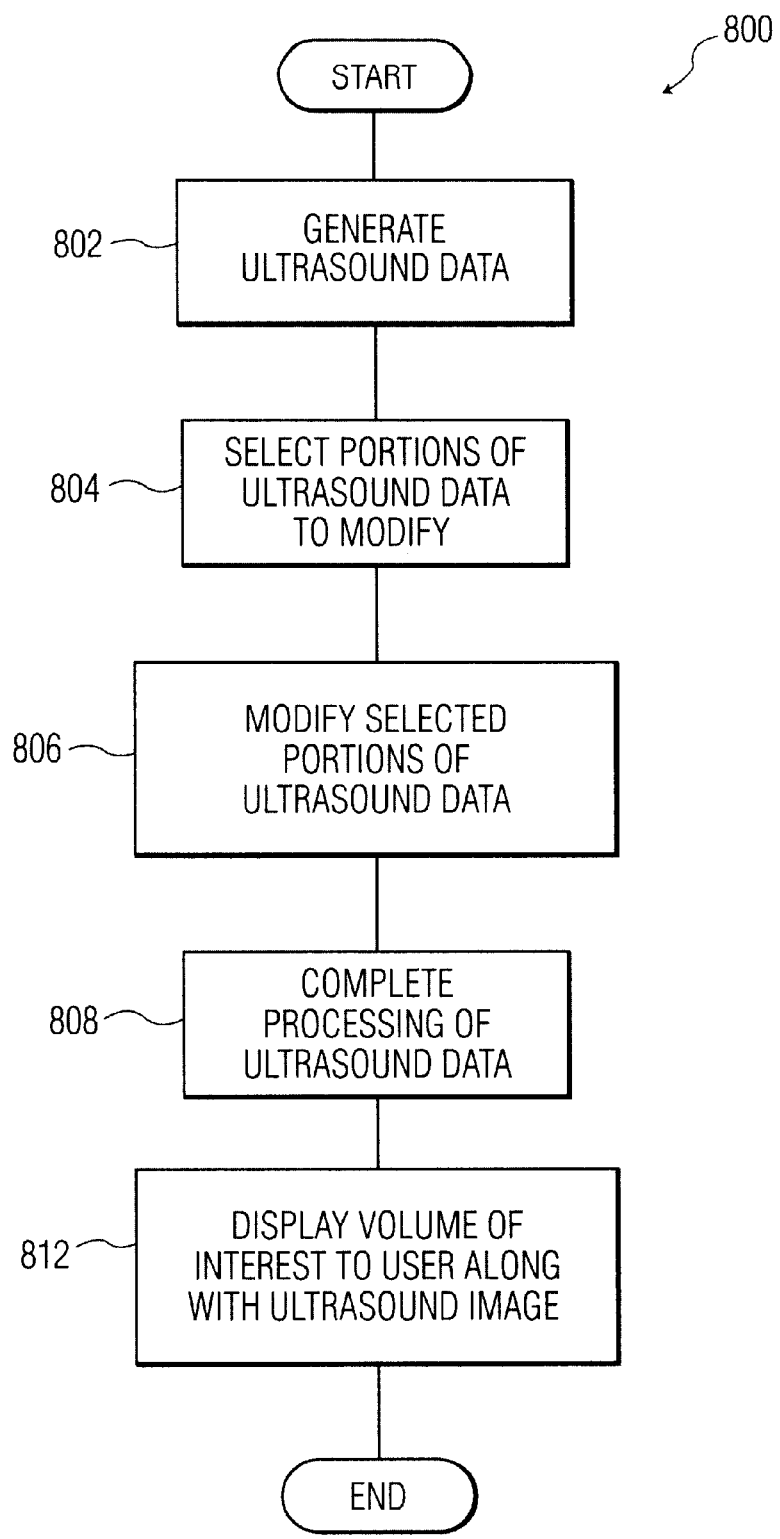
FIG. 9 is a flow chart describing the operation of the data manipulation software of FIG. 5.

FIG. 9 is a flow chart 800 describing the operation of the data manipulation software 375 of FIG. 5. In block 802 ultrasound data is generated and the volume rendered image 702 of FIG. 8 is generated. In block 804, the data manipulation software 375 and the data manipulation element 380 of FIG. 5 select portions of the ultrasound data at the output of the receive beamformer 318 to modify. The input element 338 allows a user of the system 300 control over the size and position of the shape of the volume of interest, i.e., the highlighted region 705, and possibly over the shape itself (frustum, cube, sphere, etc.). More specifically, controls associated with the input element 338 dictate changes to the translation, rotation, and magnification of the shape, and those changes are converted to a set of scan lines for the volume of interest and the ranges of intensified acoustic samples within the windows of the chosen scan lines.

In block 806, the data manipulation software 375 and the data manipulation element 380 modify the selected portions of the ultrasound data to highlight a volume of interest in the volume rendered image. In block 808, the ultrasound data at the output of the receive beamformer 318 and the ultrasound data at the output of the data manipulation element 380 are processed through the signal processor 324, the scan converter 328 and are displayed on the display unit 330. In block 812, the volume of interest (i.e., the highlighted region 705 of FIG. 8) is displayed along with the ultrasound image on the display unit 330.

Figure 10:
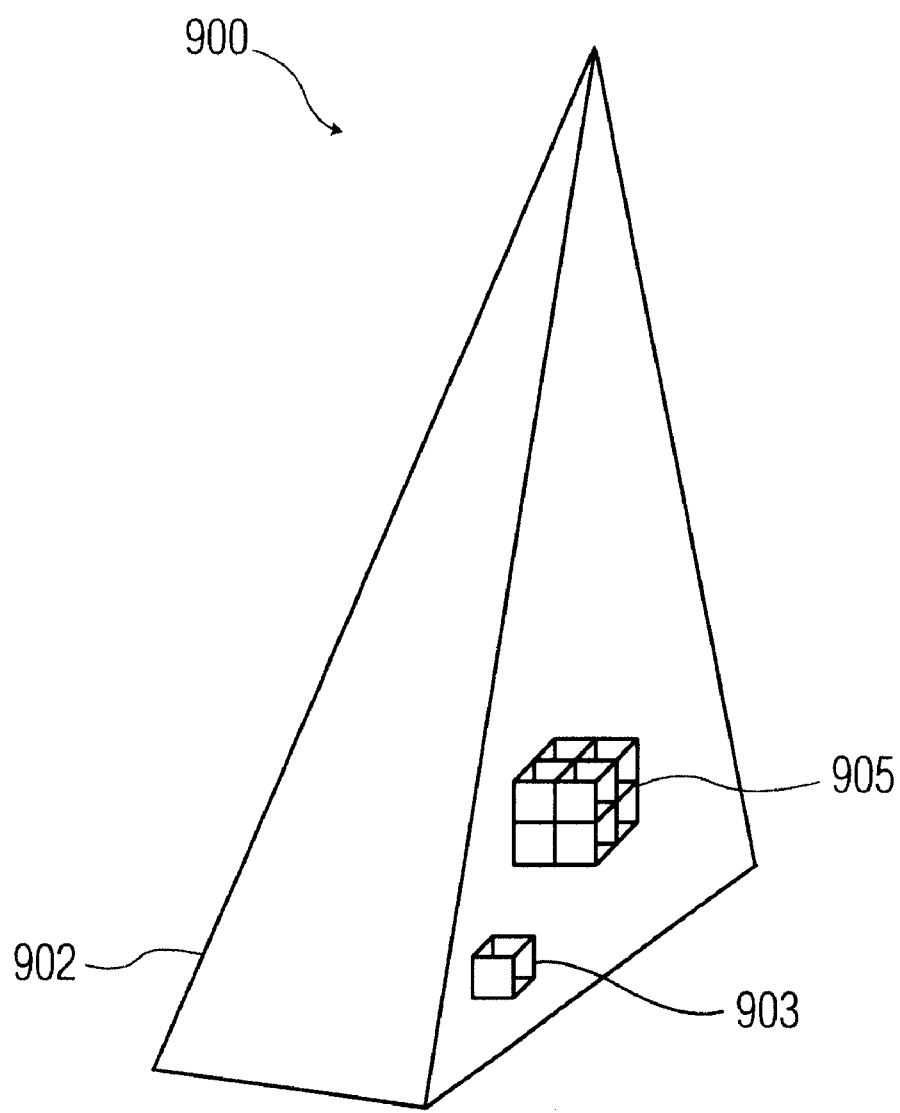
FIG. 10 is a graphical illustration of a scan volume illustrating a third embodiment of the invention.

FIG. 10 is a graphical illustration of a scan volume 900 illustrating a third embodiment of the invention. The scan volume 900 includes a volume rendered image 902 within which a region of interest characterized using a highlighted region 905 is presented to a user. However, in this embodiment of the invention, the region of interest comprises a number of volume elements referred to as "voxels," an exemplary one of which is illustrating using reference numeral 903. The volume of interest indicated by the highlighted region 905 comprises a plurality of voxels 903.

In this embodiment of the invention, the entire volume rendered image 902 (which comprises a plurality of voxels 903), is operated on by the ray casting software 380 of FIG. 5 so that all the data within the volume rendered image 902 is altered. The opacity of each voxel 903 within the volume rendered image 902 is altered to make the volume rendered image appear translucent, or semi-translucent when viewed on the display unit 330. To display the volume of interest indicated by the highlighted region 905, a ray casting operation is performed on each voxel in the volume of interest.

The ray casting operation takes an integral along an imaginary ray through each voxel 903 in the volume of interest (highlighted region 905), and creates an image of increased opacity. The opacity of each voxel 903 within the highlighted region 905 is increased, so that it is highlighted against the lower opacity voxels that are in the volume rendered image 902, but outside of the highlighted region 905 (the volume of interest). This makes the highlighted region 905 appear more opaque than the surrounding voxels in the volume rendered image 902. Therefore, the volume of interest and the highlighted region 905 stand out against the non-highlighted data in the volume rendered image 902. In this manner, a user viewing the display unit 330 can easily see, manipulate, identify and select a volume of interest within the volume rendered image 902.

Figure 11:
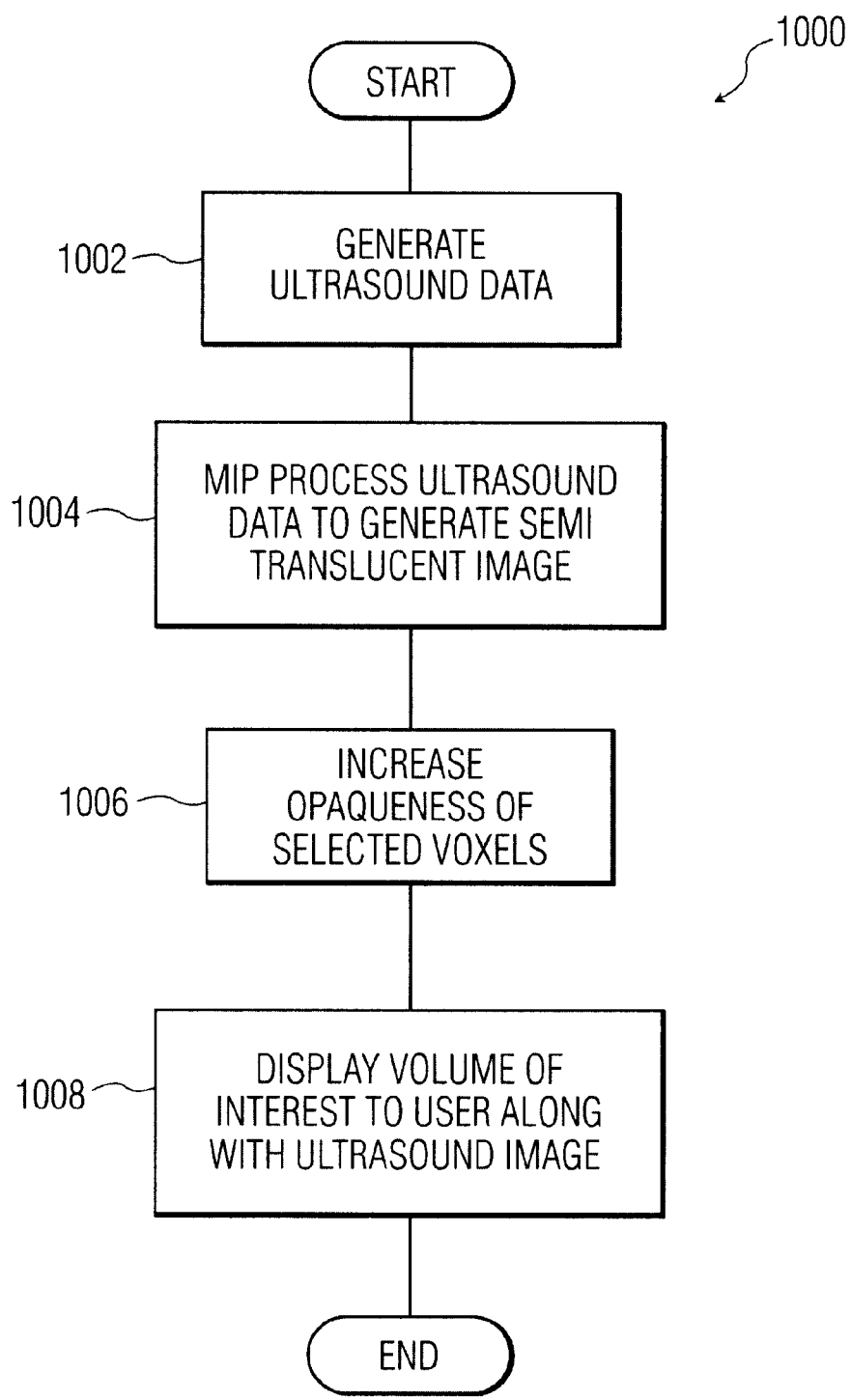
FIG. 11 is a flow chart illustrating the operation of the MIP software of FIG. 5.

FIG. 11 is a flow chart 1000 illustrating the operation of the ray casting software 380 of FIG. 5. In block 1002 the ultrasound data that forms the volume rendered image 902 of FIG. 10 is generated. In block 1004, all of the voxels 903 within the volume rendered image 902 are processed by the ray casting software 380 to generate a translucent or semi-translucent image within the volume rendered image 902.

In block 1006, the opacity of selected voxels within the highlighted region 905 is increased. In block 1008, the volume of interest, indicated by the highlighted region 905 is displayed to a user along with the ultrasound image contained within the volume rendered image 902.

The above described embodiments of the invention refer to the volume of interest being highlighted as a volume. However, the description of the invention is not to be so limited. Indeed, the techniques described above could be used to highlight only the scan lines or only the voxels at the boundary faces, or only the boundary corners, of the volume of interest. In such a case, the volume of interest may be displayed as a "wire frame" image, but can be generated by manipulating the ultrasound scan data as described above.

The embodiments of the invention allow the smooth integration of the highlighted region into the three dimensional image without having to resolve rendering issues that arise from trying to combine two renderings, one of the cursor and the other of the image. In this manner, the effects of clipping and arbitration can be minimized, especially when the volume of interest is displayed in a different hardware color plane than the ultrasound image.

It will be apparent to those skilled in the art that many modifications and variations may be made to the present invention, as set forth above, without departing substantially from the principles of the present invention. For example, the present invention can be used with any ultrasound imaging system. Furthermore, the invention is applicable to various ultrasound imaging systems and components. All such modifications and variations are intended to be included herein.

What is claimed is:

1. A system for identifying a volume of interest in a three dimensional (3D) ultrasound image, comprising:
   means for developing an ultrasound image;
   means for rendering the ultrasound image on a display; and
   means for displaying a three-dimensional (3D) cursor on the rendered ultrasound image.

2. The system of claim 1, wherein the 3D cursor is superimposed on the rendered image.

3. The system of claim 1, wherein the 3D cursor is positioned in the vicinity of the rendered image.

4. The system of claim 2, wherein the rendered image is three-dimensional.

5. A system for identifying a volume of interest in an ultrasound image, comprising:
   means for collecting acoustic data;
   means for developing a three dimensional (3D) ultrasound image from the collected acoustic data;
   means for rendering the ultrasound image on a display;
   means for modifying selected portions of the acoustic data; and
   means for displaying the modified acoustic data in the form of a highlighted region on the rendered ultrasound image, wherein the highlighted region defines an included volume.

6. The system of claim 5, wherein the means for modifying the acoustic data alters a gain associated with the acoustic data.

7. The system of claim 5, wherein the means for modifying the acoustic data alters a color associated with the acoustic data.

8. The system of claim 5, wherein the means for modifying the acoustic data alters a receive signal associated with the system.

9. The system of claim 5, wherein the means for modifying the acoustic data alters a transmit signal associated with the system.

10. The system of claim 5, wherein the modified data defines the included volume.

11. The system of claim 10, wherein a sub-set of included data resides on boundary lines of the highlighted region.

12. A system for identifying a volume of interest in an ultrasound image, comprising:
    means for collecting acoustic data;
    means for developing a three dimensional (3D) ultrasound image from the collected acoustic data;
    means for rendering the ultrasound image on a display;
    means for modifying selected portions of the rendered data; and
    means for displaying the modified rendered data in the form of a highlighted region on the rendered ultrasound image, wherein the highlighted region defines an included volume.

13. The system of claim 12, wherein the rendered data includes a plurality of voxels and wherein the means for modifying the rendered data further comprises:
    means for altering an opacity of selected voxels in the included volume to define a volume of interest; and
    means for using a ray casting projection to generate the three dimensional ultrasound image displaying the highlighted region.

14. A method for identifying a volume of interest in an ultrasound image, comprising:
    collecting acoustic data;
    developing a three dimensional (3D) ultrasound image from the collected acoustic data;
    rendering the ultrasound image on a display;
    modifying selected portions of the acoustic data; and
    displaying the modified acoustic data in the form of a highlighted region on the rendered ultrasound image, wherein the highlighted region defines an included volume.

15. The method of claim 14, further comprising modifying the acoustic data to alter a gain associated with the acoustic data.

16. The method of claim 14, further comprising modifying the acoustic data to alter a color associated with the acoustic data.

17. The method of claim 14, further comprising modifying the acoustic data to alter a receive signal associated with the collected acoustic data.

18. The method of claim 14, further comprising modifying the acoustic data to alter a transmit signal used to generate the acoustic data.

19. The method of claim 14, wherein the modified data defines the included volume.

20. The system of claim 19, wherein a sub-set of included data resides on boundary lines of the highlighted region.

21. A method for identifying a volume of interest in an ultrasound image, comprising:

collecting acoustic data;

developing a three dimensional (3D) ultrasound image from the collected acoustic data;

rendering the ultrasound image on a display;

modifying selected portions of the rendered data; and displaying the modified rendered data in the form of a highlighted region on the rendered ultrasound image, wherein the highlighted region defines an included volume.

22. The method of claim 21, wherein the rendered data includes a plurality of voxels and wherein the modifying the rendered data further comprises:

altering an opacity of selected voxels in the included volume to define a volume of interest; and using a ray casting projection to generate the three dimensional ultrasound image displaying the highlighted region.

23. A computer readable medium having a program for identifying a volume of interest in an ultrasound image, the program comprising logic for:

collecting acoustic data;

developing a three dimensional (3D) ultrasound image from the collected acoustic data;

rendering the ultrasound image on a display;

modifying selected portions of the acoustic data; and displaying the modified acoustic data in the form of a highlighted region on the rendered ultrasound image, wherein the highlighted region defines an included volume.

24. The program of claim 23, further comprising logic for modifying the acoustic data to alter a gain associated with the acoustic data.

25. The program of claim 23, further comprising logic for modifying the acoustic data to alter a color associated with the acoustic data.

26. The program of claim 23, further comprising logic for modifying the acoustic data to alter a receive signal associated with the collected acoustic data.

27. The program of claim 23, further comprising logic for modifying the acoustic data to alter a transmit signal used to generate the acoustic data.

28. The program of claim 23, wherein the modified data defines the included volume.

29. The program of claim 28, wherein a sub-set of included data resides on boundary lines of the highlighted region.

30. A computer readable medium having a program for identifying a volume of interest in an ultrasound image, the program comprising logic for:

collecting acoustic data;

developing a three dimensional (3D) ultrasound image from the collected acoustic data;

rendering the ultrasound image on a display;

modifying selected portions of the rendered data; and displaying the modified rendered data in the form of a highlighted region on the rendered ultrasound image, wherein the highlighted region defines an included volume.

31. The program of claim 30, wherein the rendered data includes a plurality of voxels and wherein the logic for modifying the rendered data further comprises logic for:

altering an opacity of selected voxels in the included volume to define a volume of interest; and using a ray casting projection to generate the three dimensional ultrasound image displaying the highlighted region.

* * * * *